W. W. WOOD.
RELEASING DEVICE FOR AIR BRAKES.
APPLICATION FILED NOV. 30, 1920.
1,402,333.
Patented Jan. 3, 1922.
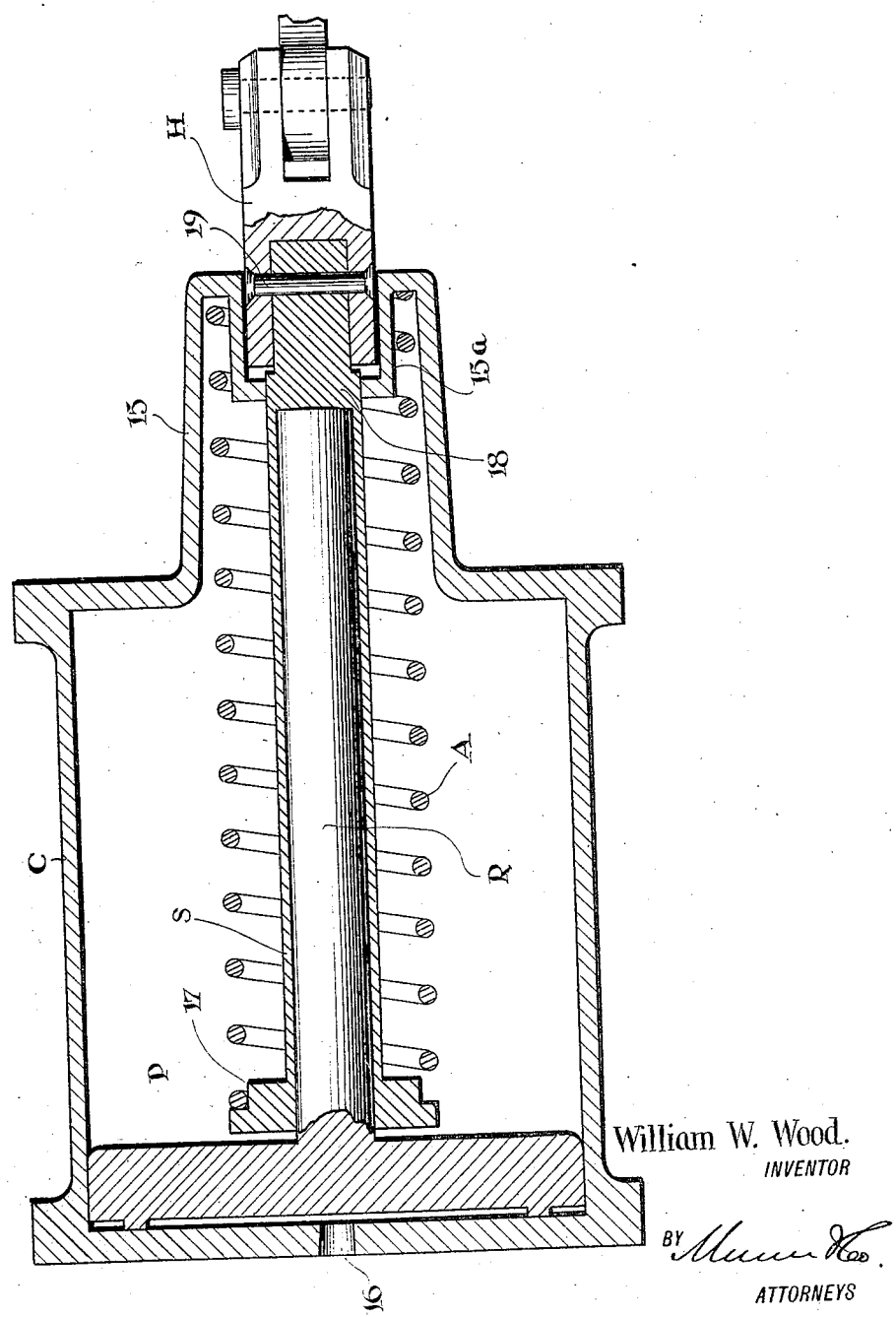
William W. Wood.
*INVENTOR*
BY
*ATTORNEYS*

UNITED STATES PATENT OFFICE.

WILLIAM WALLACE WOOD, OF LA FAYETTE, INDIANA.

RELEASING DEVICE FOR AIR BRAKES.

1,402,333.  Specification of Letters Patent.  Patented Jan. 3, 1922.

Application filed November 30, 1920. Serial No. 427,262.

*To all whom it may concern:*

Be it known that I, WILLIAM WALLACE WOOD, a citizen of the United States, and a resident of La Fayette, in the county of Tippecanoe and State of Indiana, have invented certain new and useful Improvements in Releasing Devices for Air Brakes, of which the following is a specification.

My invention relates to braking mechanism of the combined hand and pneumatic operated type, a purpose of my invention being the provision of a brake mechanism which is operable to allow the spring of the brake cylinder to release all parts of the brake gearing after a brake application by hand or air without the piston of the brake cylinder being moved from its released position.

I will describe one form of releasing device embodying my invention and will then point out the novel features thereof in claims.

In the accompanying drawing I have shown a standard form of brake cylinder having applied thereto one form of releasing device embodying my invention.

Referring specifically to the drawing, C designates a standard form of brake cylinder, one end of which is formed with a tubular extension 15 having its outer end wall inturned to provide a circular boss 15$^a$ having its periphery spaced from the inner periphery of the extension 15. The opposite end of the cylinder C is provided with a port 16 through which compressed air is admitted to or exhausted from the cylinder to effect an actuation of a piston P. Fixed to the piston P is a relatively short piston rod R, such rod being slidably embraced by or telescopically associated with a sleeve S. The sleeve S terminates at one end in an annular flange 17 and at the other end in a stem 18. As seen in the drawing, the boss 15$^a$ is provided with an opening through which the sleeve S is adapted to slide, the stem 18 normally reposing substantially within the boss and having fixedly connected thereto a cross head H of standard form. In the present instance, the cross head H is formed with a socket to receive the stem 18, while a pin 19 extends through the socket and through the stem for securing the two elements together. The cross head H is adapted to be connected with the primary lever of the air brake gearing and with the pull rod of the hand brake gearing, but as these elements form no part of the present invention a showing of the same has been omitted.

Surrounding the sleeve S and interposed between the end wall of the extension 15 and the flange 15$^a$ is a coiled expansible spring A which normally tends to bias the sleeve S inwardly in the direction of the piston P.

In the operation of the device, air under pressure is admitted to the cylinder C through the port 16 forcing the piston P to the right from the position shown in the drawing. This movement of the piston effects an application of the brakes through the usual brake gearing connected to the cross head H. As the piston P moves to the right, the free end of the piston rod R engaging the stem 18 also moves the sleeve S to the right, the latter sliding through the opening formed in the boss 15$^a$ as has been described. With the movement of the sleeve S to the right, the compression of the spring A naturally follows so that when the air admitted to the cylinder is finally discharged through the port 16 in effecting a release of the braking mechanism, the expansive force of the spring acting on the flange 17 will draw the sleeve S inwardly of the cylinder and with it the piston P and the piston rod R, the cross head H at the same time pulling the brake gearing to released position.

If the hand brake gearing be actuated to apply the brakes, its pull on the cross head H only draws the sleeve S outwardly of the cylinder, the piston P and the piston rod R remaining in normal or released position. As the sleeve S is withdrawn, the flange 17 again functions to compress the spring R so that when the hand brake gearing is finally released, the expansive force of the spring automatically returns the sleeve to normal position thereby moving the hand brake gearing to released position.

From the foregoing operation, it will be manifest that the spring A is caused to effect a releasing of all of the brake gearing subsequent to a brake application by either the hand or air brake gearing, and that when the hand brake gearing is actuated, the piston does not move but remains in its released position.

Although I have herein shown and described only one form of releasing device embodying my invention, it is to be understood that various changes and modifications may be made herein without departing from the spirit of the invention and the spirit and scope of the appended claims.

What I claim is:

1. In a brake mechanism, a cylinder, a piston within the cylinder, a piston rod fixed to the piston, a sleeve slidably fitted on the piston rod and having a closed end engageable with the piston rod, said sleeve being slidable through one end of the cylinder and adapted to be fixedly connected to a cross head, and a spring associated with the sleeve to bias the latter in the direction of the piston.

2. A releasing device for brake gearing comprising, a sleeve adapted to slidably receive the piston rod of a brake cylinder, one end of said sleeve being closed and adapted to be connected to the cross head of a brake gearing, a flange formed on one end of the sleeve, and a coiled expansible spring surrounding the sleeve and adapted to engage said flange.

3. In a brake mechanism, a brake cylinder, a piston within the cylinder, a piston rod fixed to the piston, a sleeve slidably fitted on the piston rod, a flange formed on the piston end of the sleeve, a stem formed on the opposite end of the sleeve and in abutting relation with respect to the piston rod, a cross head fixedly connected to the stem, and a coiled expansible spring surrounding the stem and interposed between one end wall of the cylinder and said flange so as to bias the sleeve inwardly of the cylinder.

WILLIAM WALLACE WOOD.